United States Patent Office

3,125,576
Patented Mar. 17, 1964

3,125,576
5 - (PIPERAZINOALKYL)10,11 - DIHYDRO - 5H - DIBENZ(b,f)AZEPINES, PROCESSES OF PRODUCING SAME AND USES THEREOF
John H. Biel, Milwaukee, Wis., assignor to Lakeside Laboratories, Inc., Milwaukee, Wis., a corporation of Delaware
No Drawing. Original application Jan. 22, 1960, Ser. No. 3,989. Divided and this application Nov. 21, 1960, Ser. No. 70,377
3 Claims. (Cl. 260—268)

This invention relates to novel chemical compounds. More particularly, this invention is concerned with the preparation and use of novel 5-substituted-10,11-dihydro-5H-dibenz(b,f)azepine derivatives.

This application is a divisional of my copending application Serial No. 3,989 filed January 22, 1960, now abandoned.

According to the present invention there are provided novel 5-substituted-10,11-dihydro-5H-dibenz(b,f)azepine derivatives of the formula

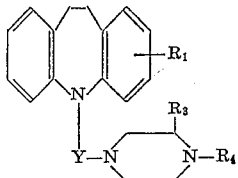

Formula 1 wherein Y is a lower alkylene of two to five carbons with at least two carbons in a straight chain between the connecting nitrogens, such as —$CH_2CH_2$-(ethylene),

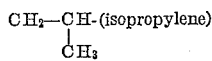

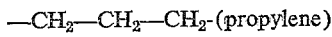

and

$R_1$ is hydrogen, a lower alkyl such as methyl, ethyl, propyl or butyl, a lower alkoxy such as methoxy, ethoxy or propoxy, a halogen such as chloro, bromo or iodo, thiomethyl, trifluoromethyl, or sulfonamido, $R_2$ and $R_3$ are hydrogen or methyl and $R_4$ is hydrogen, formyl or the group

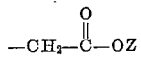

wherein Z is hydrogen, a lower alkyl such as methyl, ethyl, propyl and butyl or a disubstituted aminoalkyl such as a di-lower alkyl-amino-lower alkyl like dimethylaminoethyl, nontoxic acid addition salts thereof, and processes of preparing such compounds.

The compounds of Formula 1 in which $R_4$ is hydrogen and Y, $R_1$, $R_2$ and $R_3$ have the assigned values, advisably as nontoxic acid addition salts, produce remarkable tranquilizing and muscle relaxant properties in animals. In contrast to the usual tranquilizers like the phenothiazines, these compounds of this invention produce a tranquilizing effect without concomitant sedation, and are thus a new and useful type of psychotherapeutic agent. Even more remarkable is the discovery that, unlike other dibenzazepine derivatives, they decrease body tension and motor activity instead of increasing it. These unique and unexpected properties would appear ascribable to the secondary amino group (the unsubstituted 4-position of the piperazine ring).

The compounds of Formula 1 in which $R_4$ is hydrogen and Y, $R_1$, $R_2$ and $R_3$ have the assigned meaning can be prepared by converting-10,11-dihydro-5H-dibenz(b,f)azepine to its alkali metal salt, reacting the salt with a 4-formylpiperazinoalkyl halide to form a 5-(4-formylpiperazinoalkyl)-10,11-dihydro-5H-dibenz(b,f)azepine and hydrolyzing said compound to form a 5-(piperazinoalkyl) 10,11-dihydro-5H-dibenz(b,f)azepine. This process can be represented as follows:

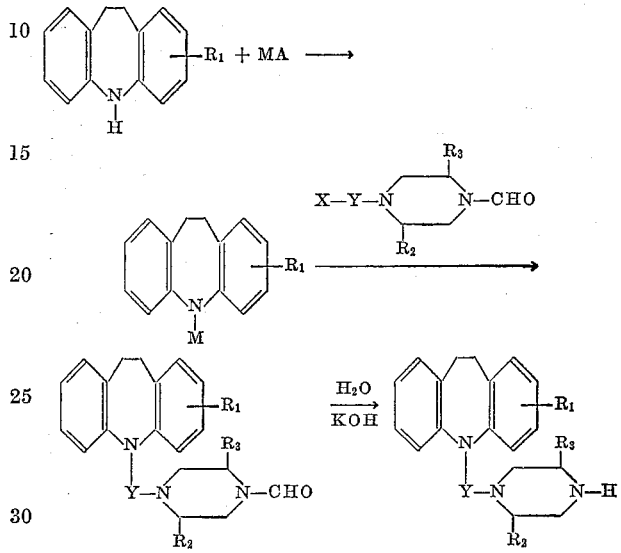

wherein Y, $R_1$, $R_2$, $R_3$ and $R_4$ have the significance previously assigned, M is an alkali metal and particularly sodium, potassium or lithium, A is hydrogen or amino and X is a reactive halogen such as chlorine, bromine or iodine.

Some of the alkali metal hydrides or amides which can be used in the first step of the process are lithium amide, sodium hydride, sodium amide, potassium amide or lithium hydride. The reaction is readily effected by bringing the reactants together in an inert anhydrous high boiling liquid reaction medium such as xylene, toluene, tetralin, dimethylformamide or cumene. Elevated temperatures such as about 75 to 150° C. are generally suitable for the reaction. In general, however, the reflux temperature is utilized since it permits ready temperature control. The alkali metal salt of the 10,11-dihydro-5H-dibenz(b,f)azepine forms rapidly and the reaction is generally completed in about 1 to 3 hours. Following termination of the reaction the product can be isolated if desired but this is ordinarily not done since it can be used as present in the reaction mixture in the next step.

In addition to 10,11-dihydro-5H-dibenz(b,f)azepine, nuclear substituted azepines such as 10,11-dihydro-5H-3-chlorodibenz(b,f)azepine, 5H - 3-bromodibenz(b,f)azepine, 10,11 - dihydro-5H-3-thiomethyldibenz(b,f)azepine, 5H-3-ethoxydibenz(b,f)azepine, 10,11-dihydro-5H-3-thioethyldibenz(b,f)azepine, 5H - 3-trifluomethyldibenz(b,f) azepine and 10,11-dihydro-5H-3-sulfonamidodibenz(b,f) azepine can be used in the reaction and alkali metal salts formed thereof.

Reaction between the alkali metal salt of the 10,11-dihydro-5H-dibenz(b,f)azepine and a 4-formylpiperazinoalkyl halide can be effected by bringing the reactants together in a suitable inert high boiling liquid reaction medium such as toluene, xylene, tetralin or cumene. The reaction mixture from the formation of the alkali metal 10,11-dihydro-5H-dibenz(b,f)azepine can be used as the reactant and solvent source to which the 4-formylpiperazinoalkyl halide can be added. Elevated temperatures of about 75 to 150° C. and particularly the reflux temperature can be employed to effect reaction. About 3 to 20 hours is generally adequate to substantially complete the reaction. After the reaction is terminated the product can be recovered by filtering the reaction mixture, distilling off the solvent and fractionally distilling the high boiling base in vacuo.

Representative 4-formylpiperazinoalkyl halides that can be employed in the reaction are 4-formyl-6-methylpiperazinopropyl chloride, 4-formylpiperazinopropyliodide, 4-formyl - 5-methylpiperazinoethyl bromide, 4-formyl-6-methylpiperazinobutyl iodide and 4-formylpiperazinoisopropyl chloride.

Typical of the compounds produced in this way are 5-(4 - formyl-6-methylpiperazinopropyl)-10,11-dihydro-5H-dibenz(b,f)azepine, 5-(4-formylpiperazinopropyl)-10,11-dihydro - 5H-dibenz(b,f)azepine, 5-(4-formyl-5-methylpiperazinoethyl) - 10,11-dihydro-5H-dibenz(b,f)azepine, 5 - (4 - formyl-6-methylpiperazinobutyl)-10,11-dihydro-5H-dibenz(b,f)azepine, and 5-(4-formylpiperazinoisopropyl)-10,11-dihydro-5H-dibenz(b,f)azepine.

The 5-(4-formylpiperazinoalkyl)-10,11-dihydro-5H-dibenz(b,f)azepines can be hydrolyzed to the 5-(piperazinoalkyl) - 10,11 - dihydro-5H-dibenz(b,f)azepines with an aqueous inorganic base such as sodium or potassium hydroxide. A concentrated alkaline solution is advisably used for the hydrolysis. Reflux temperature can be used to increase the reaction rate. From about three to 24 hours or more can be used to complete the hydrolysis with the precise time being governed at least by the reactant to be hydrolyzed and the concentration of the materials present.

On alkaline hydrolysis of the 4-formyl compounds, derivatives such as the following are produced:

5-(6-methylpiperazinopropyl)-10,11-dihydro-5H-dibenz (b,f)azepine,
5-(piperazinopropyl)-10,11-dihydro-5H-dibenz(b,f) azepine,
5-(5-methylpiperazinoethyl)-10,11-dihydro-5H-dibenz (b,f)azepine,
5-(6-methylpiperazinobutyl)-10,11-dihydro-5H-dibenz (b,f)azepine,
5-(6-methylpiperazinopropyl)-10,11-dihydro-5H-3-chlorodibenz(b,f)azepine,
5-(6-methylpiperazinopropyl)-10,11-dihydro-5H-3-trifluoromethylthyldibenz(b,f)azepine,
5-(piperazinoisopropyl)-10,11-dihydro-5H-3-methoxydibenz(b,f)azepine,
5-(piperazinopentyl)-10,11-dihydro-5H-3-sulfonamidodibenz(b,f)azepine and
5-(piperazinobutyl)-10,11-dihydro-5H-3-thiomethyldibenz(b,f)azepine.

Acid addition salts of the compound of this invention can be produced by contacting the azepine derivatives with an inorganic or organic acid such as hydrochloric, sulfuric, phosphoric, maleic, benzoic, succinic, fumaric and citric acid in a suitable solvent such as methanol, ethanol, isopropanol, ethyl acetate and acetonitrile. The salts form readily at room temperature and can be separated by conventional methods.

The compounds of Formula 1 in which $R_4$ is

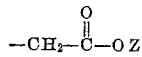

and Z has the assigned meaning, advisably as nontoxic acid addition salts, increase body tension and motor activity in animals. These compounds thus are useful as antidepressant agents and central nervous system stimulants.

Carboxymethylation of the 5-(piperazinoalkyl)-10,11-dihydro-5H-dibenz(b,f)azepines is effected by reacting said azepines with a haloacetic acid or ester thereof. This process can be represented as follows:

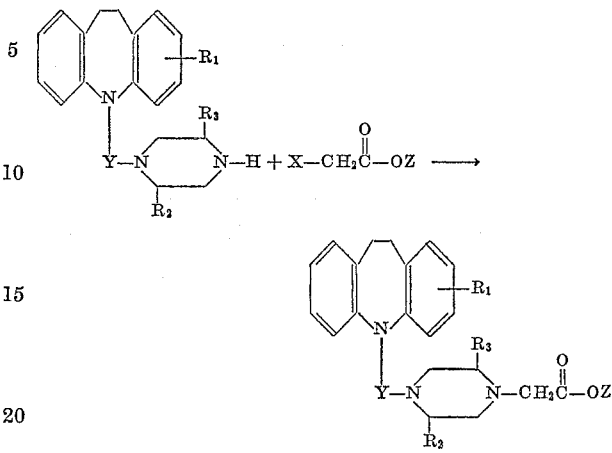

wherein $R_1$, $R_2$, $R_3$, Y, X and Z have the meaning assigned above.

Some of the haloactic acid derivatives which can be employed in the reaction are chloroacetc acid, ethyl chloroacetate, ethyl bromoacetate, dimethylaminoethyl chloroacetate, dipropylaminobutyl bromoacetate and isopropyl bromoacetate.

The reaction can be effected by bringing the reactants together in an inert liquid reaction medium such as methanol, ethanol, isopropanol, benzene, toluene and xylene, advisable in the presence of an acid acceptor such as potassium carbonate, sodium carbonate or calcium oxide. Elevated temperatures such as the reflux temperature can be used to promote the reaction and complete it in a time of from about generally 1 to 20 hours. Following the reaction the product can be isolated by conventional means. Thus, the reaction mixture can be filtered, the filtrate diluted with ether, dried over potassium carbonate and the product isolated by fractional distillation in vacuo.

Some of the products so formed are 5-(4-carboxymethylpiperazinopropyl)-10,11-dihydro-5H-dibenz(b,f)azepine,
5-(4-carbethoxymethyl-6-methylpiperazinopropyl)-10,11-dihydro-5H-dibenz(b,f)azepine,
5-[4-(beta-dimethylaminoethoxy)-carboxymethylpiperazinopropyl]-10,11-dihydro-5H-dibenz(b,f)azepine,
5-(4-carbethoxymethylpiperazinoethyl)-10,11-dihydro-5H-dibenz(b,f)azepine,
5-(4-carbethoxymethylpiperazinopropyl)-10,11-dihydro-5H-3-chlorodibenz(b,f)azepine,
5-(4-carbethoxymethylpiperazinopropyl)-10,11-dihydro-5H-3-trifluoromethyldibenz(b,f)azepine,
5-(4-carboxymethylpiperazinopentyl)-10,11-dihydro-5H-dibenz(b,f)azepine and
5-(4-carboxymethylpiperazinoisopropyl)-10,11-dihydro-5H-dibenz(b,f)azepine.

These compounds form acid addition salts as the other compounds indicated above.

The novel azepine derivatives of this invention can be administered to animals for the stated purposes as pure compounds. It is advisable, however, to first combine one or more of the compounds with a suitable pharmaceutical carrier to attain a more satisfactory size to dosage relationship.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the azepine derivatives and can be administered one or more at a time at regular intervals. Such forms should, however, contain a concentration of about 0.1 to 10% by weight of the azepine derivative.

A typical tablet can have the composition:

|   |   | Mg. |
|---|---|---|
| (1) | 5-(6-methylpiperazinopropyl)-10,11-dihydro-5H-dibenz(b,f)azepine dimaleate | 10 |
| (2) | Starch U.S.P. | 57 |
| (3) | Lactose U.S.P. | 73 |
| (4) | Talc U.S.P. | 9 |
| (5) | Stearic acid | 6 |

Powders 1, 2 and 3 are slugged, then granulated, mixed with 4 and 5, and tableted.

The following examples are presented to illustrate the preparation of representative compounds within the scope of the invention.

EXAMPLE 1

*3-(4-Formyl-6-Methylpiperazino)-Propyl Chloride*

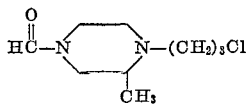

To a mixture of 64.1 g. (0.5 mole) of 1-formyl-3-methylpiperazine and 69.0 g. (0.5 mole) of potassium carbonate in 200 cc. of ethanol was added dropwise 69.5 g. (0.5 mole) of 1,3-trimethylene bromohydrin. The mixture was stirred at reflux for 6 hours. The salts were separated by filtration and the solvent removed under reduced pressure leaving 98 g. of oil. This material was diluted with 400 cc. of chloroform, filtered and acidified with anhydrous hydrochloric acid. Then 119 g. (1.0 mole) of thionyl chloride was added dropwise and the mixture refluxed 5 hours. The solvent and excess thionyl chloride were removed under reduced pressure and the product obtained dissolved in 100 cc. of water. After extracting with ether, the aqueous phase was saturated with potassium carbonate and extracted with ether. The ether extracts were dried over anhydrous sodium sulfate and the solvent removed under reduced pressure. Fractionation of the residue afforded 27.8 g. (25.6%) of the desired product, B.P. 112–128° C. at 0.01–0.4 mm.

*Analysis.*—Calcd. for $C_9H_{17}N_2OCl$: N, 13.69; Cl, 17.32. Found: N, 13.72; Cl 16.93.

The presence of a band at 6.01μ in the infrared establishes the presence of an amide carbonyl.

EXAMPLE 2

*5-(4-Formyl-6-Methylpiperazinopropyl)-10,11-Dihydro-5H-Dibenz(b,f)Azepine*

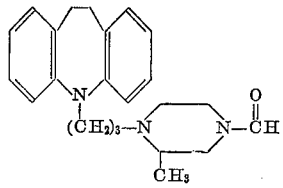

A 20 g. sample of 10,11-dihydro-5H-dibenz(b,f)azepine was converted to the anion by refluxing 3 hours with 4 g. of sodamide in 100 cc. of xylene. The mixture was cooled to 40–50° C. and 24 g. (0.1 mole +10% excess) of freshly prepared 3 - (4-formyl-6-methylpiperazino)-propyl chloride was added and the mixture refluxed 18 hours. The salts were separated by filtration and washed with benzene. The solvent was removed under reduced pressure and the resulting oil fractionated, yielding 22.2 g. (61%) of the desired product, B.P. 234–237° C. at 20μ.

*Analysis.*—Calcd. for $C_{23}H_{29}N_3O$: N, 11.57. Found: N, 11.51.

EXAMPLE 3

*5-(6-Methylpiperazinopropyl)-10,11-Dihydro-5H-Dibenz(b,f)Azepine Dimaleate*

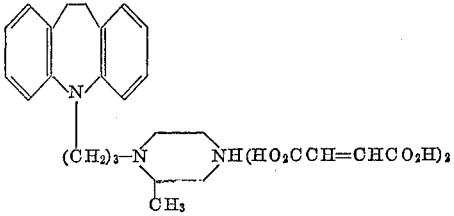

A 21.2 g. (0.06 mole) sample of 5-(4-formyl-6-methylpiperazinopropyl) - 10,11-dihydro-5H-dibenz(b,f)azepine was dissolved in 250 cc. of absolute ethanol, 17 g. of 40% potassium hydroxide added and the mixture refluxed for 24 hours. The reaction mixture was cooled, poured into 400 cc. of water and extracted with ether. The ether extracts were washed with water, dried over potassium carbonate and the solvent removed by distillation leaving 19.0 g. of oil. The infrared spectrum showed no absorption in the 6μ region thus showing that the formyl group had been removed.

An 8.0 g. sample of the base was converted to the dimaleate salt yielding 13.4 g., M.P. 155–159° C. Several recrystallizations from ethanol afforded 8.6 g. of the pure salt, M.P. 156–158° C.

*Analysis.*—Calcd. for $C_{30}H_{37}N_3O_8$: N, 7.40; N.E., 141.9. Found: N, 7.33; N.E. 133.9.

EXAMPLE 4

*5-(4-Carbethoxymethyl-6-Methylpiperazinopropyl)-10, 11-Dihydro-5H-Dibenz(b,f)Azepine Dihydrochloride*

A mixture of 10.5 g. (0.0315 mole) of 5-(6-methylpiperazinopropyl) - 10,11-dihydro-5H-dibenz(b,f)azepine and 4.35 g. (0.0315 mole) potassium carbonate in 100 cc. of ethanol was treated over a 3 hour period with a solution of 5.26 g. of ethyl bromoacetate in 25 cc. of ethanol and the mixture allowed to stir about 18 hours at room temperature. After refluxing for 6 hours, the inorganic salts were separated by filtration and washed with ether. The filtrate was diluted to ca. 600 cc. with ether and washed with water. After drying over potassium carbonate, the solvent was removed by distillation leaving 12.5 g. of viscous oil. The crude product absorbed at 5.76μ in the infrared thus confirming the introduction of the ester grouping. Solution of the base in ether and treatment with ethereal hydrochloric acid afforded the dihydrochloride salt which after crystallization from acetone weighed 12.8 g.; M.P. 202–204° C. Recrystallization from methanol-ether afforded 12.2 g. of the pure salt, M.P. 206–208° C.

*Analysis.*—Calcd. for $C_{28}H_{37}N_3O_2Cl_2$: N, 8.50; Cl⁻, 14.35. Found: N, 8.50; Cl⁻, 14.12.

Various changes and modifications of the invention can be made and, to the extent that such variations incorporate the spirit of this invention, they are intended to be included within the scope of the appended claims.

What is claimed is:

1. A member of the group consisting of compounds of the formula

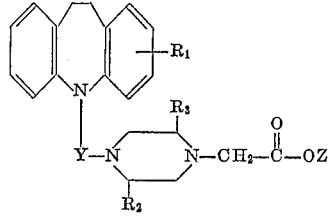

and nontoxic acid addition salts thereof, wherein $R_1$ is a member of the group consisting of hydrogen, halogen, lower alkyl, lower alkoxy, thiomethyl, trifluoromethyl and sulfonamido, $R_2$ and $R_3$ are members of the group consisting of hydrogen and methyl, Z is a member of the group consisting of hydrogen, lower alkyl and di-lower-alkylamino-lower alkyl groups and Y is an alkylene group of 2 to 5 carbons with at least two carbons between the azepine and piperazine nitrogens to which it is bonded.

2. 5 - (4-carbethoxymethyl-6-methylpiperazinopropyl)-10,11-dihydro-5H-dibenz(b,f)azepine.

3. 5 - (4-carbethoxymethyl-6-methylpiperazinopropyl)-10,11-dihydro-5H-dibenz(b,f)azepine dihydrochloride.

References Cited in the file of this patent

UNITED STATES PATENTS

| | | |
|---|---|---|
| 2,874,155 | Cusic et al. | Feb. 17, 1959 |
| 2,902,485 | Horclois | Sept. 1, 1959 |
| 2,981,736 | Gailliot et al. | Apr. 25, 1961 |

FOREIGN PATENTS

| | | |
|---|---|---|
| 215,335 | Australia | June 11, 1958 |

OTHER REFERENCES

Hollister: Annals of Internal Medicine, Volume 51, No. 5, November 1959, pages 1040–41.

UNITED STATES PATENT OFFICE
CERTIFICATE OF CORRECTION

Patent No. 3,125,576                                        March 17, 1964

John H. Biel

It is hereby certified that error appears in the above numbered patent requiring correction and that the said Letters Patent should read as corrected below.

Column 1, lines 36 and 38, the formula should appear as shown below instead of as in the patent:

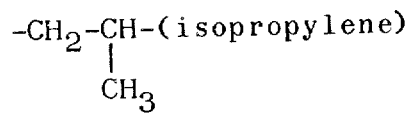

column 2, lines 57, 59, and 60, for "5H-3-", each occurrence, read -- 10,11-dihydro-5H-3- --; column 3, line 55, for "compound" read -- compounds --; column 4, line 33, for "advisable" read -- advisably --; column 5, line 32, for "(0.5) mole)" read -- (0.5 mole) --.

Signed and sealed this 21st day of July 1964.

(SEAL)
Attest:

ESTON G. JOHNSON                                    EDWARD J. BRENNER
Attesting Officer                                  Commissioner of Patents